United States Patent [19]
Oftedal et al.

[11] Patent Number: 5,026,335
[45] Date of Patent: Jun. 25, 1991

[54] DOWNSHIFTING WORK VEHICLE USING DIFFERENTIAL LOCK SWITCH

[75] Inventors: Teryl M. Oftedal, Tsukuba, Japan; Clarence G. Bourgeous, Dubuque, Iowa; Haruyuki Morita, Ibaraki; Masayoshi Miyaji, Oyama, both of Japan

[73] Assignee: Deere & Company, Moline, Ill.

[21] Appl. No.: 319,381

[22] Filed: Mar. 3, 1989

[51] Int. Cl.⁵ ............................................. F16H 1/44
[52] U.S. Cl. ..................................... 475/198; 180/249
[58] Field of Search ............... 475/198, 199, 231, 249, 475/254; 74/335, 336.5, 337, 845; 180/248, 249, 250, 900, 333, 336

[56] References Cited

U.S. PATENT DOCUMENTS

| | | | |
|---|---|---|---|
| 2,830,670 | 4/1958 | Ferguson | 180/333 |
| 3,675,508 | 7/1972 | Blank | 74/74.5 |
| 3,788,166 | 1/1974 | Hart et al. | 475/198 |
| 4,320,813 | 3/1982 | Manna | 180/249 |
| 4,570,509 | 2/1986 | Nighswonger | 74/710.5 |
| 4,610,178 | 9/1986 | Kameshita | 74/335 |
| 4,690,239 | 9/1987 | Takahashi et al. | 180/249 |
| 4,702,342 | 10/1987 | Hale | 180/333 |
| 4,703,671 | 11/1987 | Jikihara | 475/231 |
| 4,727,710 | 3/1988 | Kuhn | 180/336 |
| 4,817,468 | 4/1989 | Leigh-Monstevens et al. | 74/335 |

FOREIGN PATENT DOCUMENTS

| | | |
|---|---|---|
| 0270674 | 6/1988 | European Pat. Off. |
| 63-078824 | 4/1988 | Japan |
| WO87/06287 | 10/1987 | PCT Int'l Appl. |
| 2042105 | 9/1980 | United Kingdom |

Primary Examiner—Allan D. Herrmann
Assistant Examiner—Ryan W. Massey

[57] ABSTRACT

The differential lock switch for a work vehicle is used to trigger a control system for downshifting the vehicle from second to first. The control system comprises five relays. The first three relays detect if the vehicle is in second; if the vehicle is going forward; and if the differential lock switch is actuated. The fourth relay is used to latch the signal from the third relay so that the differential lock switch can be released and the vehicle will remain in first. The fifth relay receives signals from the first four relays and manipulates the correct solenoid valves for downshifting the vehicle.

14 Claims, 1 Drawing Sheet

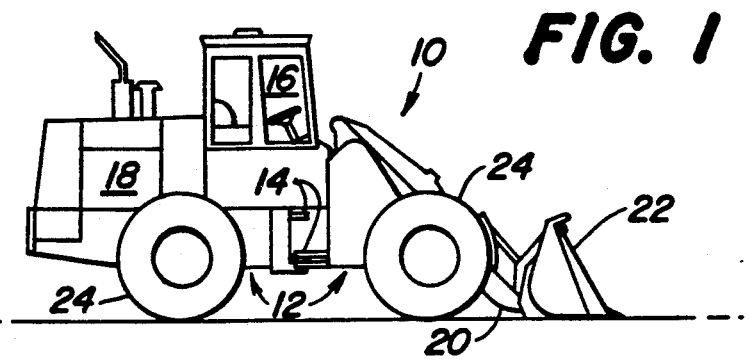
FIG. 1
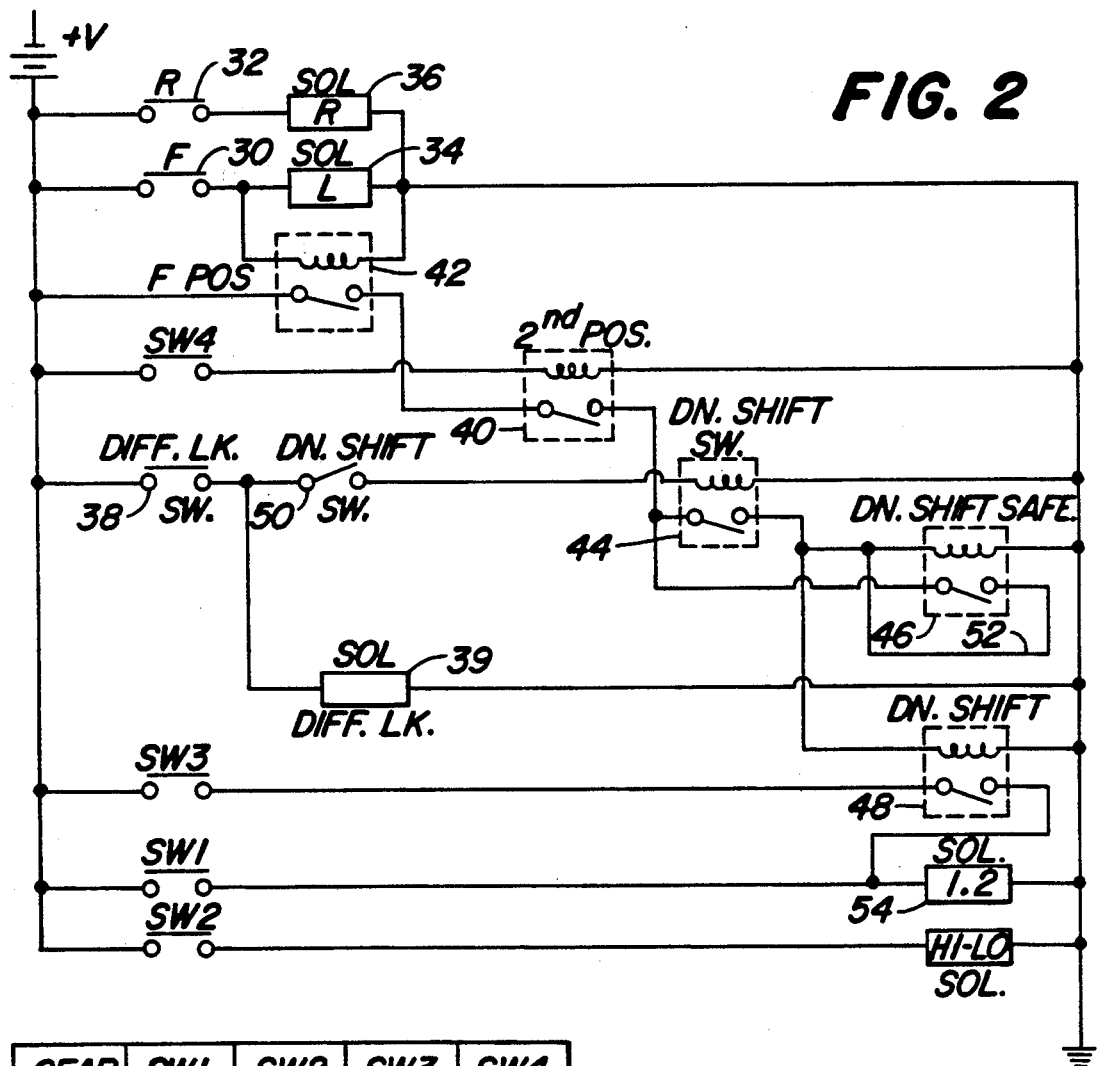
FIG. 2
| GEAR | SW1 | SW2 | SW3 | SW4 |
|------|-----|-----|-----|-----|
| 1st  | ON  | ON  | OFF | OFF |
| 2nd  | OFF | ON  | ON  | ON  |
| 3rd  | ON  | OFF | OFF | OFF |
| 4th  | OFF | OFF | OFF | OFF |
FIG. 3

DOWNSHIFTING WORK VEHICLE USING DIFFERENTIAL LOCK SWITCH

BACKGROUND OF THE INVENTION

1. Field of the Invention

The invention is directed to an electric circuit for downshifting a work vehicle such as a loader by depressing the differential lock switch.

2. Description of the Prior Art

When operating a loader the operator typically drives the loader in second gear between bucket loading operations. This speeds up the cycle time because the vehicle moves faster when not in the pile. On a loader with Forward-Neutral-Reverse (F-N-R) controls and a four speed gear control selector (1-2-3-4) a typical loading cycle, beginning with the loader in second gear as it approaches the pile to load the bucket, would be as follows:

1. downshift 2F-1F (left hand)
2. engage differential lock (left foot)
3. load bucket (right hand)
4. shift F-R (left hand)
5. upshift 1R-2R (left hand)
6. shift 2R-2F (left hand
7. dump bucket (right hand)
8. shift 2F-2R (left hand)
9. shift 2R-2F (left hand)
10. approach pile repeat to 1

During these operations the operator is also steering the vehicle. On differential lock equipped loaders, as indicated at step 2, the operator depresses a differential lock switch with his left foot to increase traction and crowd during the loading operation. The differential lock switch maybe located to the left of the brake pedal and may comprise an electrical switch that triggers a solenoid valve for hydraulically locking the differential. As the differential lock switch is a non-latching electrical switch, the operator must maintain pressure on the switch as long as differential lock is desired. An electrically operated differential lock system is disclosed in U.S. Pat. No. 4,570,509 assigned to one of the assignees of the present invention, and which is incorporated herein by reference. U.S. Pat. No. 3,675,508 discloses an electrically actuated power shift transmission.

With the advent of electric shift transmissions it has become possible to use an electric switch located on the control lever to downshift the loader during the loading operation. Such a system is disclosed in U.S. Pat. No. 4,610,178. PCT Application WO87/06287 discloses a wheel loader that is automatically downshifted in response to bucket and boom parameters.

SUMMARY

It is one of the objects of the present invention to provide a control arrangement for simplifying the downshifting of a loader during a loader operation.

It is another object of the present invention to provide a control arrangement that automatically upshifts the loader from 1F-2R when the loader is shifted into reverse.

It is another object of the present invention to provide control arrangement that can be triggered by depressing the differential lock switch.

It is another object of the present invention to provide a latching downshift switch that maintains the downshift after the differential lock switch has been released.

It is one advantage of the present invention that the control system is isolated from the differential lock by a downshift control switch. By isolating the differential lock from the control system, the differential lock can be operated in a conventional mode when the downshift control switch is open or together with the control system when the downshift control switch is closed.

The present invention comprises five relays that act as sensors and switches for manipulating various solenoids in an electric shift transmission. The first solenoid acts as a sensor to detect whether the loader is in second gear. The second relay acts as a sensor to detect if the loader gear shift selector is in the FORWARD position. The first and second relays are coupled in series. The output of these two relays is applied to a third relay and a fourth relay that comprise the downshift sensing and latching relays. The third and fourth relays are coupled in parallel to one another. The third relay acts as a sensor to detect if a downshift control actuation switch is actuated and if the differential lock switch is actuated. Both of these switches are coupled in series. The fourth relay is a downshift latching relay which maintains the control arrangement in a latched condition when the third relay is actuated. The fifth relay is the downshift actuation relay and directs an electric signal to the solenoid valves of the transmission. The fifth relay senses the condition of the fourth relay for controlling the appropriate solenoid valves.

BRIEF DESCRIPTION OF THE DRAWINGS

FIG. 1 is a side view of a four-wheel drive loader.

FIG. 2 is an electrical schematic of the control arrangement.

FIG. 3 is a table of the electric shift transmission gears and the triggering switches.

DETAILED DESCRIPTION

Loader 10, illustrated in FIG. 1, is provided with a supporting structure 12 that is articulated about pivots 14. The rear portion of the supporting structure is provided with an operator's cab 16 and engine housing 18. The forward portion of the supporting structure is provided with boom 20 having bucket 22. The engine or prime mover located in engine housing 18 is coupled to a transmission for driving wheels 24 for propelling the vehicle. The transmission includes front and rear differentials for the front and rear wheels. A telescoping drive shaft transmits power from the engine across the pivot points to the front differential. Either the front differential and/or the rear differential is provided with a differential lock for selectively locking the differential to provide more traction. Although the present invention is being described as being used in a four-wheel drive loader, it may be used in other work vehicles.

FIG. 2 illustrates the electrical schematic of the present invention. The electric shift transmission is provided with four gear switches SW1, SW2, SW3 and SW4 that control solenoids for actuating various valves controlling the flow of hydraulic control fluid to various clutches and/or brakes in the transmission. The switching control for the transmission is illustrated in FIG. 3. For example, if switches SW1 and SW2 are closed and switches SW3 and SW4 are open, the transmission is in first gear. Similarly, if switch SW1 is open and switches SW2, SW3 and SW4 are closed, the transmission is in second gear. FORWARD and REVERSE are controlled by switches 30 and 32, respectively, which controlled forward and reverse solenoids 34 and 36, respectively.

Switches SW1, SW2, SW3, SW4, 30 and 32 are non-latching switches. That is they are biased open and must be maintained in a closed position. The gear selector switches are actuated by the transmission control lever. The direction switches are actuated by a direction control lever.

The vehicle is also provided with a differential lock switch 38 that controls solenoid 39. The differential lock switch is a pedal switch located adjacent to the brake pedal. As with the other selection switches, the differential lock switch is a non-latching switch. Solenoid 39 controls a solenoid valve that supplies hydraulic fluid to the differential lock mechanism.

The control system for the present invention comprises five relays 40, 42, 44, 46, and 48. First relay 40 operates as a senor to detect if the gear shift selector is in its second position. As shown in FIG. 2, the coil of relay 40 is coupled in series with switch SW4. Referring to the FIG. 3 table, it shows that switch SW4 is closed when the transmission is in second gear. Therefore, when the coil is energized by the transmission being in second gear, relay 40 is actuated. When relay 40 is actuated, it provides a gear signal.

The second relay 42 operates as a sensor to detect if the the loader is in FORWARD or REVERSE. The coil of relay 42 is coupled in parallel with forward solenoid 34. When forward switch 30 is depressed it simultaneously energizes solenoid 34 and the coil of relay 42. When the coil of relay 42 is energized by the loader being shifted into forward, relay 42 is actuated. When relay 42 is actuated, it provides a direction signal.

Relays 40 and 42 are coupled in series and form an AND circuit supplying a combined gear and direction signal to the third and fourth relays 44 and 46, respectively. The third and fourth relays are coupled in parallel and provide latched and non-latched switch signals to the fifth relay 48. The third relay 44 operates as a sensor to detect if differential lock switch 38 and downshift control switch 50 are closed. The downshift control switch 50 is used to actuate the control system. As switches 38 and 50 are in series, they form an AND circuit supplying a triggering signal to relay 44. The triggering signal energizes the coil of relay 44 actuating the relay. When relay 44 is actuated it provides a non-latched switch signal.

The fourth solenoid 46 comprises a latching assembly for latching the gear, direction and switch signals from relays 40, 42 and 44. When relay 44 is energized by switches 38 and 50 the combined signal from relays 40 and 42 is directed to the coil of relay 46. Relay 46 is then closed and maintained in a closed condition through feedback loop 52. Feedback loop 52 maintains the latched switch signal as long as relays 40 an 42 are actuated. Should the vehicle be shifted out of second gear or be shifted from FORWARD, the coil of relay 46 would become de-energized and relay 46 deactuated.

The output signal from relays 40 and 42, and relays 44 and/or 46 is directed to the coil of fifth relay 48. The fifth relay is coupled to switch SW3 which is closed when the vehicle is in second. The output of this relay is coupled to the output of switch SW1 which controls the position of solenoid 54. Solenoid 54 controls the positioning of clutches 1 and 2 of the transmission. As illustrated in FIG. 3, when the vehicle is in second, switch SW1 is open deenergizing solenoid 54. When the vehicle is in first switch, SW1 is closed energizing the solenoid. With this control system, the output of closed switch SW3 is applied to solenoid 54 energizing this solenoid and shifting the transmission into first.

The above described control system simplifies a loading operation. The typical control cycle, after the operator has already selected the control system by closing switch 50, is now:

1. depress differential lock switch 38 (left foot) automatically downshifting the loader from 2F-1F
2. load bucket (right hand)
3. shift F-R (left hand) automatically shifts to 2R
4. shift 2R-2F (left hand)
5. dump bucket (right hand)
6. shift 2F-2R (left hand)
7. shift 2R-2F (left hand)
8. approach pile return to 1

By using the present invention two control steps have been eliminated. In addition, it should be noted that the operator has the option at step 1 of leaving the differential lock on or turning it off as relay 46 latches the downshift signal.

The invention should not be limited to the above-described embodiment, but should be limited solely to the claims that follow.

We claim:

1. A self-propelled work vehicle for performing a work operation, the vehicle comprising:
   a supporting structure;
   ground engaging wheels mounted to the support structure;
   a prime mover supported by the supporting structure, the prime mover supplying power to the vehicle;
   a transmission operatively coupled between the prime mover and the ground engaging wheels for propelling the vehicle, the transmission having at least two gear positions, the transmission is also provided with a lockable differential, the lockable differential having an actuation switch for locking the lockable differential; and
   a control system for shifting the transmission from one gear to the other, the control system having a control switch that triggers the system and is interconnected with the differential lock switch, whereby actuation of the differential lock switch triggers the control system for shifting the transmission when the control switch is actuated.

2. A work vehicle as defined by claim 1 wherein the differential lock switch is non-latching.

3. A work vehicle as defined by claim 2 wherein the differential lock switch and the control system actuation switch are coupled in series.

4. A work vehicle as defined by claim 3 wherein the control system is provided with a gear sensor for detecting which of the two gears the transmission is operating, the gear sensor providing a gear signal.

5. A work vehicle as defined by claim 4 wherein the control system is provided with a direction sensor that detects which direction the vehicle is being driven, the direction sensor providing a direction signal.

6. A work vehicle as defined by claim 5 wherein the control system is provided with a switch sensor that detects of the differential lock switch and the control switch are actuated, the switch sensor providing a switch signal.

7. A work vehicle as defined by claim 6 wherein the control system is provided with a latching assembly for storing the switch signal from the switch sensor by latching the latching assembly.

8. A work vehicle as defined by claim 7 wherein the control system is provided with a downshift sensor for detecting the gear signal, the direction signal, and the switch signal, and the control system in response to these signals, shifts the transmission.

9. A work vehicle as defined by claim 5 wherein the gear sensor comprises a first relay and the direction sensor comprises a second relay, the first and second relays being coupled in series.

10. A work vehicle as defined by claim 9 wherein the switch sensor comprises a third relay and the latching assembly comprises a fourth relay, the third and fourth relays being coupled in parallel with the first and second relays.

11. A work vehicle as defined by claim 10 wherein the fourth relay is provided with a feedback loop for the gear signal and the direction signal, latching the fourth relay in response to the switch signal.

12. A work vehicle as defined by claim 11 wherein the downshift sensor comprises a fifth relay which is actuated by the gear signal, direction signal and switch signal.

13. A work vehicle as defined by claim 7 wherein the latching assembly becomes unlatched in response to the gear signal.

14. A work vehicle as defined by claim 7 wherein the latch assembly becomes unlatched in response to the direction signal.

* * * * *